United States Patent Office 3,657,447
Patented Apr. 18, 1972

3,657,447
METHOD OF CONTROLLING BACTERIA AND FUNGI
Edward D. Weil, Yonkers, Keith J. Smith, Lockport, and Emil J. Geering, Grand Island, N.Y., assignors to Hooker Chemical Corporation, Niagara Falls, N.Y.
No Drawing. Application Jan. 29, 1968, Ser. No. 701,049, now Patent No. 3,489,766, dated Jan. 13, 1970, which is a continuation-in-part of application Ser. No. 605,535, Dec. 29, 1966, which in turn is a continuation-in-part of application Ser. No. 852,931, Nov. 16, 1957. Divided and this application Oct. 20, 1969, Ser. No. 871,236
Int. Cl. A01n 9/22
U.S. Cl. 424—274        6 Claims

ABSTRACT OF THE DISCLOSURE

The method of controlling microbes, comprising applying an effective amount of a compound selected from the group consisting of

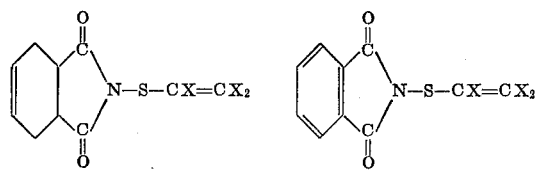

wherein X is a halogen, to the locus to be treated.

---

This is a division of our parent application, Ser. No. 701,049, filed Jan. 29, 1968, now U.S. Pat. 3,489,766, issued Jan. 13, 1970 which, in term, was a continuation-in-part of copending application S.N. 605,535 (filed Dec. 29, 1966, now abandonded), which, in turn, was a continuation-in-part of copending application S.N. 852,931, filed Nov. 16, 1959 (now U.S. Pat. 3,296,302), and was copending with U.S. Pat. No. 3,200,146.

This invention relates to novel compositions of matter and novel anti-microbial uses.

In accordance with this invention, there is provided N - trihalovinylmercaptotetrahydrophthalimide. There is further provided a method for the control of microbes which comprises applying to the locus to be treated an efiective amount of N - trihalovinylmercaptophthalimide.

Said compound may be prepared by reacting trihalovinylsulfenyl halides or tetrachloroethyl sulfenyl halides with tetrahydrophthalimide. Said trihalovinylsulfenyl halides may be characterized by the formula $$CX_2{=}CX{-}SX$$

wherein X is a halogen such as fluorine, chlorine, bromine, or iodine, preferably chlorine or bromine. Some of the trihalovinylsulfenyl halides which may be used to prepare the compounds of this invention are, e.g., trichlorovinylsulfenyl chloride, trichlorovinylsulfenyl bromide, bromodichlorovinylsulfenyl chlorides, dibromochlorovinylsulfenyl bromides, tribromovinylsulfenyl chloride, tribromovinylsulfenyl bromide, and the like.

Said trihalovinylsulfenyl halides, while stable per se, are reactive with many substances, including oxygen and oxidizing agents such as nitric acid and hydrogen peroxide (with which they form the corresponding sulfinic and sulfonic derivatives); with chlorine and bromine (with which they form pentahaloethylsulfenyl halides); with nucleophilic anions (which, generally, first replace the halogen on the sulfur atom); with nitrogen bases bearing a replaceable hydrogen or metal on the nitrogen atom (which bases generally replace the halogen on the sulfur atom with a nitrogen-containing radical); with reducing agents such as hydriodic acid (with which they generally form the disulfide corresponding to the sulfenyl chloride);

with aromatic compounds (to form trichlorovinylaryl sulfides); with olefins such as, e.g., unsaturated resins and unsaturated natural oils (with which they form 2-haloalkyl sulfides); with acetylenes (with which they form 2-halovinyl sulfides); with hydrogen sulfides (with which they form tri- and polysulfides corresponding to the sulfenyl halide); with organic phosphites (with which they form, inter alia S-trihalovinylphosphorothiolates); and with carbanions (with which they form trihalovinyl alkyl sulfides).

Said trihalovinylsulfenyl halides are preferably synthesized either by the dehydrohalogenation of tetrahaloethylsulfenyl halides or by the chlorinolysis of trihalovinyl disulfides (or higher polysulfides). Sulfenyl bromides may also be prepared from the sulfenyl chlorides by halogen exchange methods such as the reaction of hydrogen bromide with the sulfenyl chloride.

Trichlorovinylsulfenyl chloride may be prepared, for example, by chlorinolysis of bis(trichlorovinyl) disulfide. Dichlorobromovinylsulfenyl chloride may be prepared by chlorinolysis of bis(dibromochlorovinyl) disulfide. Dibromochlorovinylsulfenyl chloride may be prepared by the chlorinolysis of bis(dibromochlorovinyl) disulfide. If trisulfides or higher polysulfides are used, sulfur chlorides are formed as by-products. Monosulfides do not undergo this chlorinolysis reaction. The chlorinolysis may, if desired, be accelerated by the use of catalysts such as iodine or Lewis acids.

Said trihalovinylsulfenyl halides, when reacted with phthalimides, will form N-trihalovinylmercaptotetrahydrophthalimide or N-trihalovinylmercaptophthalimide as illustrated by the reactions shown below:

(1)
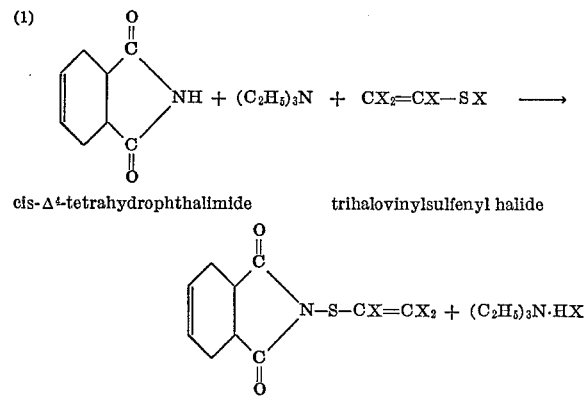

cis-Δ⁴-tetrahydrophthalimide    trihalovinylsulfenyl halide

N-trihalovinylmercaptotetrahydrophthalimide (2)
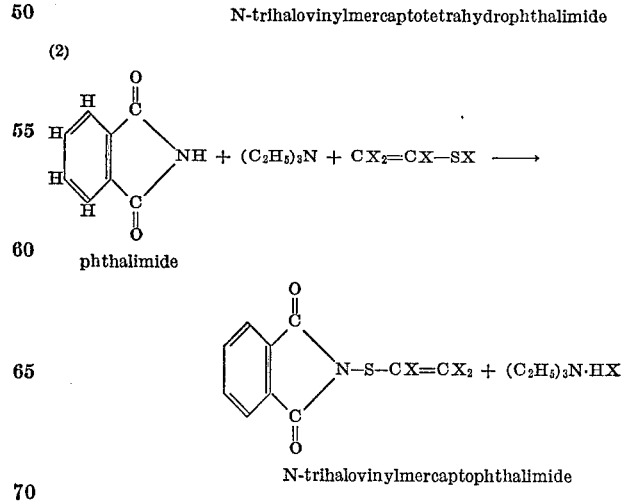

phthalimide

N-trihalovinylmercaptophthalimide

N - trichlorovinylmercaptotetrahydrophthalimide may also be prepared by reacting tetrahydrophthalimide with 1,1,2,2- or 1,2,2,2-tetrahaloethylsulfenyl halide in the presence of a sufficient quantity of a base, in which case dehydrohalogenation in situ occurs after the two reactants have condensed, and the desired N-trihalovinylmercaptotetrahydrophthalimide is obtained. This reaction is illustrated by the equations presented below, wherein cis-$\Delta^4$-tetrahydrophthalimide and 1,1,2,2-tetrachloroethylsulfenyl chloride are the reactants.

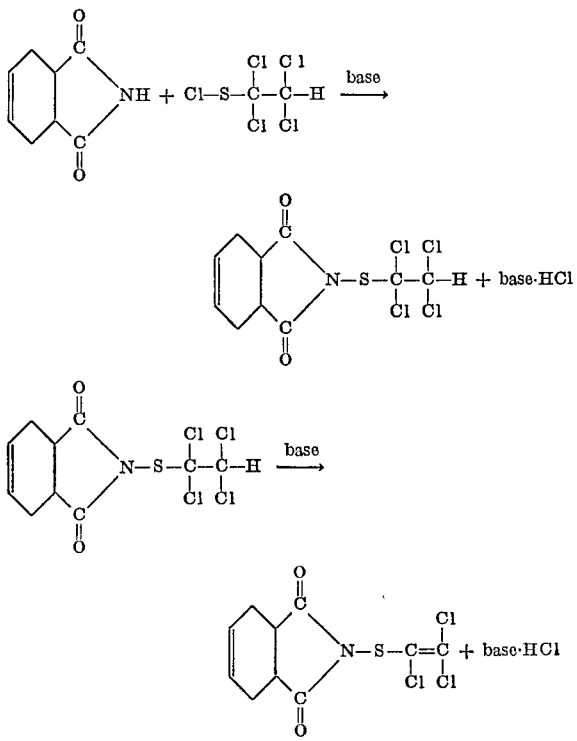

In reaction (a) N-1,1,2,2-tetrachloroethylmercaptotetrahydrophthalimide (i.e., cis-N - [1,1,2,2-tetrachloroethyl)-thio] 4 - cyclohexene - 1,2-dicarbamide) is formed. This compound undergoes dehydrochlorination in situ in reaction (b) to form the compound of this invention, N-trichlorovinylmercaptotetrahydrophthalimide (i.e. cis - N-[(trichlorovinyl) thio] 4 - cyclohexene - 1,2-carbimide). Both the aforementioned compounds are fungicidal.

In general, any chlorocarbon, aromatic, or hydrocarbon solvent may be used in the aforementioned process, although it is preferred to use chlorocarbon solvents. Some of the more preferred solvents include, e.g., chloroform, methylene chloride, carbon tetrachloride, trichloroethylene, perchloroethylene, and the like.

Bases which may be used in applicants' process include, inter alia, tertiary amines, alkali metal hydroxides, alkali metal alkoxides, and alkaline earth metal hydroxides. Some of the amines which may be used in said processes include trialkylamines, such as trimethylamine, triethylamine, tributylamine, and the like; diethylcyclohexylamine; diethylethanolamine; N,N-diethylaminoacetic acid; methyliminodipropionic acid; dimethylaminopropionitrile; N-methyldipropylenetriamine; dimethyl-(2-methoxyethyl) amine; diethyl(ethoxyethoxypropyl)amine; dimethylpiperazine; N-(2-methoxyethyl)piperidine; bis(N-diethylaminoethyl)-p-phenylene ether; and the like. Some of the hydroxides which may be used in said process include, inter alia, sodium hydroxide, calcium hydroxide, potassium hydroxide, strontium hydroxide, lithium hydroxide, rubidium hydroxide, and the like; it is preferred to use the alkali metal hydroxides in applicants' process. Some of the alkoxides which may be used in said process are of the formula MOR wherein M is an alkali metal and R is an alkyl group of from 1 to 18 carbon atoms; it is preferred to use an alkoxide wherein R is of 1 to about 6 carbon atoms, and it is even more preferred to use an alkoxide wherein R is from 1 to about 3 carbon atoms. It is to be understood that the aforementioned list of amines, hydroxides, and alkoxides is merely illustrative and that many other bases may be used in applicants' process.

In said process, about 1 mole of sulfenyl halide is used per mole of phthalimide or tetrahydrophthalimide, although either of said reactants may be used in excess. The reaction is conducted at a temperature of from about $-35$ to about 100 degrees centigrade, although it is preferred to have the reaction mixture at a temperature of from about 0 to about 70 degrees centigrade, and it is even more preferred to have said temperature at from about 10 degrees centigrade to about ambient temperature.

The compound of this invention is anti-microbial. When used, e.g., to control soil pathogens, such as Pythium, said compound may be employed at an application rate of from about 0.5 to about 200 pounds per acre, the preferred rate being dependent upon the soil to be treated, the pathogen and crop involved, and other factors well known to those skilled in the art of soil disinfestation, through it is generally preferred to use an application rate of from about 2 to about 100 pounds per acre. When used, e.g., to control foliar fungi such as *Alternaria solani*, said compound may be applied to the locus to be treated at a concentration of from about 10 to about 500,000 parts of compound per million parts of carrier, though it is generally preferred to use a concentration of from about 50 to about 50,000 parts per million. When used to control baceteria such as *Staphylococcus aureus* (Gram +), said compound may be applied to the locus to be treated at a concentration of about 1 to 10,000 parts per million parts of carrier, though it is preferred to use a concentration of from about 10 to 1000 parts per million.

In a preferred embodiment of this invention, X is selected from the group consisting of chlorine and bromine. In an even more preferred embodiment of this invention X is chlorine.

EXAMPLE 1

To 29 parts of bis(trichlorovinyl)disulfide were added 6.3 parts of chlorine at a temperature of $-20$ degrees centigrade. The mixture was allowed to warm slowly to room temperature, and then was distilled through a short fractionating column, yielding 27 parts of trichlorovinylsulfenyl chloride, a red, malodorous liquid boiling at 39–45 degrees centigrade at (0.3–0.5 millimeters of mercury pressure). The infrared spectrum showed the presence of a double bond at 6.55 m$\mu$. The presence of the sulfenyl function was proved by the release of iodine from potassium iodide solution immediately upon admixture of the product with said solution. Elemental analysis revealed that the product was comprised of 72 percent chlorine and 15.7 percent sulfur, indicating that it was trichlorovinylsulfenyl chloride, which has a theoretical chlorine content of 71.8 percent and a theoretical sulfur content of 15.7 percent.

EXAMPLE 2

23.5 parts of tetrachloroethylsulfenyl chloride was dissolved in 30 parts of chloroform, said dissolution occurring at a temperature of 20 degrees centigrade. To this solution was added a solution of 10 parts of triethylamine in 120 parts of chloroform. This mixture was allowed to stand for four hours, at which time it was quickly washed with cold water and rapidly stripped under water pump vacuum to yield 18 parts of trichlorovinylsulfenyl chloride, which, upon infrared analysis, exhibited the same spectrum as did the product of Example 1.

EXAMPLE 3

14.6 parts of phthalimide and 10.1 parts of triethylamine were dissolved in 120 parts of chloroform, said dissolution occurring at a temperature of 20 degrees centigrade. To this solution was added 20 parts of trichlorovinylsulfenyl chloride. The mixture was stirred for four hours, at which time it was quickly washed with cold water (to remove triethylamine hydrochloride), evaporated to about one-half volume, and filtered to remove unreacted phthalimide. The filtrate was evaporated to dryness and was then recrystallized from carbon tetrachloride to yield 13 parts of a light-tan, crystalline product with a melting point of 133–135 degrees centigrade and having the correct chlorine analysis for N-trichlorovinylmercaptophthalimide. Elemental analysis also revealed the product was comprised of 4.54 percent nitrogen; theoretical nitrogen content for N-trichlorovinylmercaptophthalimide is 4.76 percent. When, instead of phthalimide, tetrahydrophthalimide is used, the corresponding tetrahydro-derivative is obtained.

EXAMPLE 4

A solution of 23.5 parts (0.1 mole) of tetrachloroethylsulfenyl chloride in 30 parts of chloroform was added over a period of 15 minutes to a solution of 14.6 parts (0.1 M) of phthalimide, 20.2 parts (0.2 mole) of triethylamine, and 120 parts of chloroform. During said addition the temperature of the reaction mixture was about 20 degrees centigrade. Thereafter, the reaction mixture was cooled to about 10 degrees centigrade, which cooling caused the precipitation of 2.8 parts of unreacted phthalimide which was removed from the reaction mixture. The remaining solution was evaporated to about one-half volume and then cooled to yield 9.6 parts of a solid with a melting point of 124–128 degrees centigrade. Said solid was recrystallized from heptane, and yielded a light-tan crystalline product with a melting point of 133–135 degrees centigrade. Elemental analysis indicated that said product was comprised of N-trichlorovinylmercaptophthalimide.

When other tertiary amines are used, good results are obtained. Similarly, when alkali metal hydroxides are used, a good yield of N-trichlorovinylmercaptophthalimide is obtained.

EXAMPLE 5

To a solution of 30.2 parts of tetrahydrophthalimide, 44.4 parts of triethylamine, and 150 parts of chloroform was added 51.7 parts of tetrachloroethylsulfenyl chloride. Said addition occurred at room temperature, and was made over a period of one hour. After said addition the reaction mixture was concentrated on a steam bath under reduced pressure. The resulting mixture was washed with water, and from said mixture were extracted 39.3 parts of triethylamine hydrochloride. The mixture from which said triethylamine hydrochloride had been extracted was separated into two fractions, both of which had a different solubility in ethyl ether. The less soluble fraction (M.P. 155 degrees centigrade) was heated at 100 degrees centigrade/0.25 millimeter vacuum in a sublimation apparatus, and a small amount of said fraction sublimed. The residue, after elemental analysis thereof, was discovered to have 9.2 percent sulfur and 4.15 percent nitrogen, indicating the presence of N-trichlorovinylmercaptotetrahydrophthalimide.

EXAMPLE 6

The procedure of Example 4 was essentially followed, with the exception that 22.2 parts (0.12 mole) of triethylamine and 23.5 parts (0.1 mole) of tetrachloroethylsulfenyl chloride were used. The chloride determination of the washings of the reaction mixture indicated the presence of 27.4 parts of triethylamine hydrochloride, indicating the product was comprised of N-trichlorovinylmercaptophthalimide inasmuch as the theoretical amount of triethylamine hydrochloride (two equivalents) is 27.5 parts.

EXAMPLES 7 AND 8

In Examples 7 and 8, the products of the examples were tested to determine whether they possessed antimicrobial activity. The following test methods were used:

Bactericidal test

The bacteria were grown on agar slants for 20 hours. To a mixture of the chemical to be tested and nutrient agar were added two drops of the bacterial suspension, and this mixture was shaken and then poured onto sterilized Petri plates. The plates were incubated for 24 hours and the bacterial growth noted.

Spray tests (fungicides)—Early blight

Tomato plants were sprayed with 100 milliliters of the chemical to be tested, dried, inoculated with spores of *Alternaria solani*, and incubated in a moist chamber at 70 degrees Fahrenheit for 24 hours. Control plants were not sprayed with the chemical. Percent control was determined by the formula:

Percent Control =

$$\frac{(\text{number of spots which develop on leaves of untreated tomato plant} - \text{number of spots which develop on leaves of treated plant}) \times 100}{\text{number of spots which develop on leaves of untreated plant}}$$

Soil fungicide tests—Pythium

Soil naturally infested with Pythium species was treated with the chemical solution to be tested and allowed to stand 3 days before planting. Plastic pots 3.5 x 3.0 inches were filled with the soil, and the chemical applied to the soil therein by drenching. After 3 days, ten pea seeds, Perfection variety, were planted in each pot. Percent emergence was recorded.

EXAMPLE 7

The product of Example 3, N-trichlorovinylmercaptophthalimide, exhibited 10, 46, 94, 96, and 100 percent control of *Alternaria solani* at concentrations of 20, 25, 50, 80, 160 and 320 parts per million, respectively. Said N-trichlorovinylmercaptophthalimide exhibited 20, 80 and 100 percent control of Pythium at application rates of 16, 32, and 64 pounds per acre, respectively (i.e., at an application rate of 32 pounds per acre of N-trichlorovinylmercaptophthalimide, 80 percent of the pea seeds planted in the Pythium-infested soil emerged). At a concentration of 38 parts per million, complete control of the bacteria *Staphylococcus aureus* was obtained.

When bromodichlorovinylmercaptophthalimide or dibromochlorovinyl-mercaptophthalimide is used instead of N-trichlorovinylmercaptophthalimide, similar results are obtained. Similarly good results are obtained when trichloro- and tribromo-vinylmercaptotetrahydrophthalimide are used.

EXAMPLE 8

The product of Example 4, exhibited 51, 79, 84, 98 and 100 percent control of *Alternaria solani* at concentrations of 25, 80, 100 and 160 and 320 parts per million, respectively. At an application rate of 64 pounds per acre, 20 percent control of Pythium was exhibited. At a concentration of 255 parts per million, complete control of *Staphylococcus aureus* was obtained.

When trichlorovinylmercaptotetrahydrophthalimide is used instead of N-trichlorovinylmercaptotetrahydrophthalimide, similar results are obtained.

While the invention has been described with reference to certain specific embodiments, it will be recognized by those skilled in the art that many variations are possible without departing from the spirit and scope of the invention.

What is claimed is:
1. The method of controlling microbes of the group consisting of bacteria and fungi which comprises applying to plants and soil infested with said microbes a bacteriacidally or fungicidally effective amount of a compound selected from the group consisting of

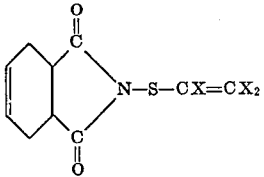

and

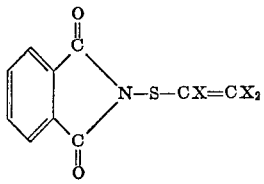

wherein X is a halogen selected from the group consisting of chlorine and bromine.

2. The method of claim 1 wherein the compound

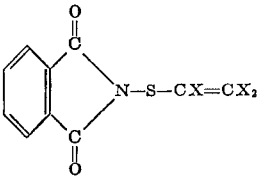

is applied to said plants and soil.

3. The method of claim 2 wherein X is chlorine.
4. The method of claim 2, wherein X is bromine.
5. The method of claim 4, wherein the microbes are fungi.
6. The method of claim 4, wherein the microbes are bacteria.

References Cited
UNITED STATES PATENTS
3,200,146  8/1965  Weil et al. _____ 260—543

JEROME D. GOLDBERG, Primary Examiner